United States Patent [19]

Hinton

[11] Patent Number: 5,393,183
[45] Date of Patent: Feb. 28, 1995

[54] CAPTIVE NUT

[75] Inventor: Dennis L. Hinton, Yorba Linda, Calif.

[73] Assignee: Kaynar Technologies, Inc., Fullerton, Calif.

[21] Appl. No.: 197,736

[22] Filed: Feb. 17, 1994

[51] Int. Cl.[6] .................... F16B 37/08; F16B 43/00
[52] U.S. Cl. ..................... 411/432; 411/361; 411/533; 411/999
[58] Field of Search ............ 411/360, 361, 366, 432, 411/967, 969, 970, 999, 533

[56] References Cited

U.S. PATENT DOCUMENTS

| | | |
|---|---|---|
| 67,451 | 8/1867 | Pratt . |
| 134,204 | 12/1872 | Horton . |
| 797,673 | 8/1905 | Fish . |
| 926,953 | 7/1909 | Mervin . |
| 1,570,148 | 4/1925 | Herr . |
| 2,506,953 | 5/1950 | Dzus .................... 411/533 X |
| 3,209,806 | 10/1965 | Currier et al. ............ 411/361 |
| 3,209,807 | 10/1965 | Ryner ..................... 411/361 |
| 4,026,060 | 5/1977 | Barnes ..................... 43/22 |
| 4,571,133 | 2/1986 | Lindow .................... 411/11 |
| 5,219,255 | 6/1993 | Hussain et al. ............ 411/432 |

*Primary Examiner*—Neill R. Wilson
*Attorney, Agent, or Firm*—Lyman R. Lyon

[57] ABSTRACT

A captive nut comprises an internally threaded nut body having torque receiving wrench pads and an annular truncated conical surface terminating in a radially extending load transfer surface. The nut body is accepted in a complementary cup-shaped washer having a conical cylindrical wall portion complementary to the conical wall portion of the nut body so as to retain the nut body. An initially truncated conical retention element is disposed between the load transfer surface of the nut body and a radial portion of the cup-shaped washer. Torquing of the nut body toward a workpiece effects deformation of the retention element nut into a complementary annular recess in the bolt thereby permanently capturing the nut on the bolt.

2 Claims, 1 Drawing Sheet

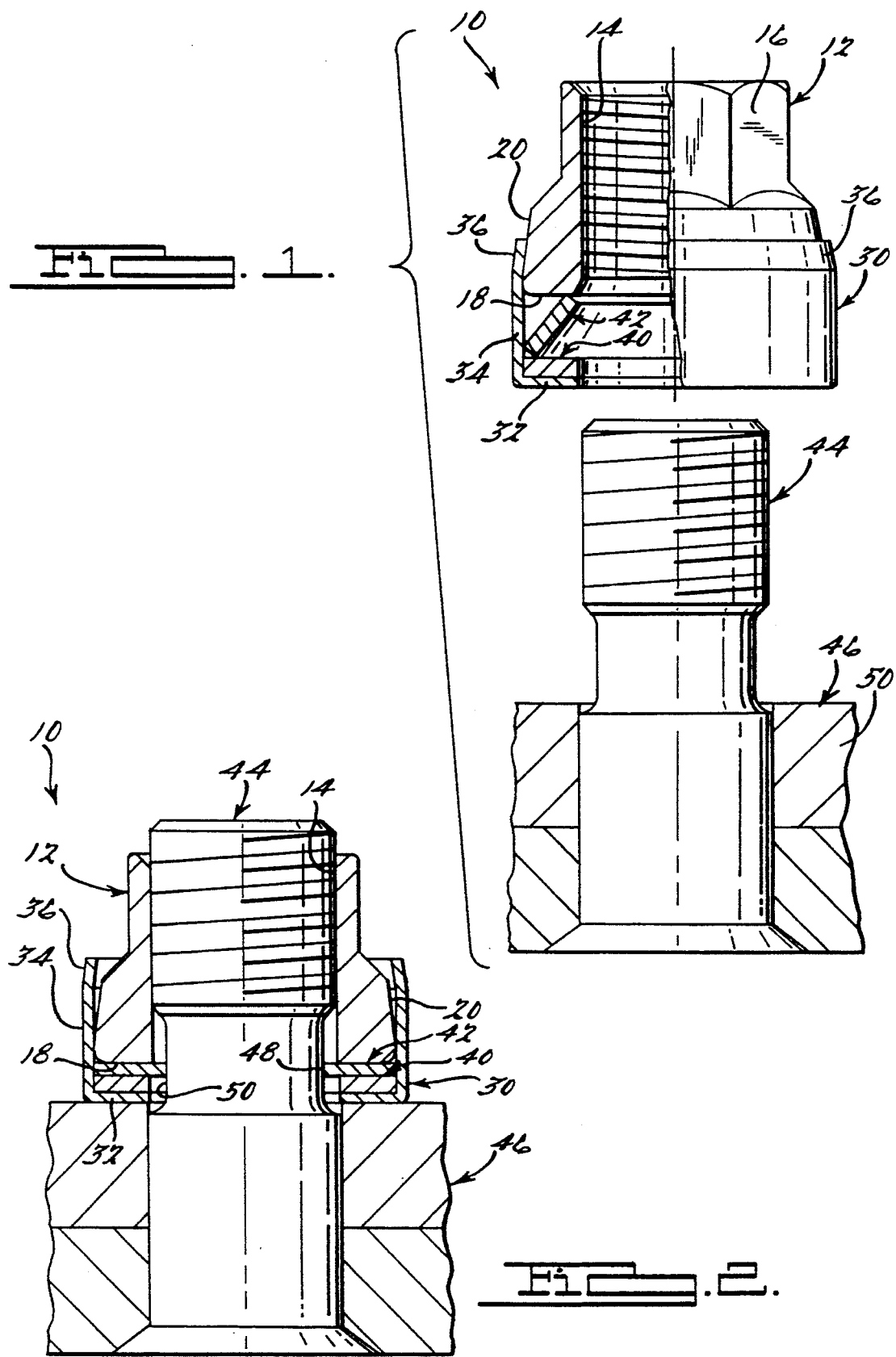

CAPTIVE NUT

BACKGROUND OF THE INVENTION

The present invention relates generally to fasteners and more particularly to a nut that is captive to a bolt after assembly therewith.

Notwithstanding the fact that most nuts used in the aircraft industry are provided with a prevailing torque or other locking means, certain applications on an aircraft require that the nut be incapable of separation from a mating bolt. In addition, where discrete locking elements or washers are used, such auxiliary elements are preferably permanently captured both prior to and after installation of the nut on a bolt, to maximize assembly efficiency and preclude inadvertent disassociation.

Captive nuts heretofore known and used generally comprise an annular internally threaded nut body having a deformable portion that engages an annular recess in the shank or threads of a bolt to preclude disassociation after assembly with the bolt. When the nut is torqued down against a workpiece, the deformable portion thereof moves radially inwardly into the recess in the bolt. While such nuts exhibit satisfactory structural integrity the cost thereof is prohibitive and no provision is made for the capture of auxiliary elements prior to assembly with a bolt.

SUMMARY OF THE INVENTION

The present invention relates to a new and improved captive nut that insures positive capture of all elements of the nut assembly both prior to and after assembly with a bolt thereby maximizing assembly efficiency and insuring structural integrity. Specifically, the captive nut of the invention comprises an internally threaded nut body that transfers load from bolt to a workpiece. The nut body has conventional torque receiving wrench pads and an annular truncated conical surface terminating in a radially extending load transfer surface. The nut body is accepted in a complementary cup-shaped washer having a conical cylindrical wall portion complementary to the conical wall portion of the nut body so as to retain the nut body. A flat annular spacer and an initially truncated conical retention element are disposed between the load transfer surface of the nut body and a radial portion of the cup-shaped washer. Torquing of the nut body toward a workpiece effects deformation of the retention element of the nut assembly into a complementary annular recess in the bolt thereby capturing the nut on the bolt.

BRIEF DESCRIPTION OF THE DRAWINGS

FIG. 1 is a cross-sectional view of a captive nut in accordance with the present invention prior to assembly with a complementary bolt; and FIG. 2 is a cross-sectional view of the nut of FIG. 1 after assembly with the bolt.

DETAILED DESCRIPTION OF THE PREFERRED EMBODIMENT

A captive nut 10, in accordance with a preferred constructed embodiment of the present invention, comprises an nut body 12 having an internally threaded bore 14 and a plurality of torque receiving wrench pads 16. The wrench pads 16 are orientated so as to accept a conventional wrench (not shown).

The body 12 of the nut 10 has a flat annular radially extending load transfer surface 18 extending radially outwardly of the threaded bore 14. The nut body 12 also has a truncated conical outer surface 20 that extends between the load transfer surface 18 and wrench pads 16.

In accordance with one feature of the invention, a cup-shaped washer 30 comprises a radially extending load transfer portion 32, a cylindrical axially extending intermediate portion 34, and a truncated conical end portion 36 complementary to the annular truncated conical portion 20 of the nut body 12. The conical portion 36 of the washer 30 is telescoped over the conical portion 20 of the nut body 12 so as to form an interference fit therewith. An annular spacer 40 is seated on the load transfer portion 32 of the retainer element 30 to position a locking element 42.

In accordance with another feature of the invention, the locking element 42 is of truncated conical configuration and made of relatively soft nonresilient material. The element 42 is disposed between the load transfer surface 18 of the nut body 12 and the spacer washer 40.

Assembly of the nut 10 with a bolt 44 and subsequent torquing of the nut body against a workpiece 46 effects permanent deformation of the locking element 42 into the flat condition whereby a radially inner edge portion 48 thereof moves into a complementary annular recess 50 in the bolt 44 thereby to permanently capture the nut 10 on the bolt 44.

While the preferred embodiment of the invention has been disclosed, it should be appreciated that the invention is susceptible of modification without departing from the scope of the following claims.

I claim:

1. A captive nut usable in combination with a bolt having an annular recess between a workpiece retained by the bolt and a threaded portion thereof comprising:

an annular nut body having an internally threaded bore for the acceptance of a bolt, a plurality of wrench pads, a radially extending load transfer surface, and a truncated conical section disposed between the wrench pads and the load transfer surface, a cup-shaped washer having an annular radially extending workpiece engaging portion and an annular axially extending truncated conical portion telescoped over the truncated conical section on said nut body so as to retain said nut body relative to said washer; and an annular locking element disposed between the load transfer surface of said nut body and the radially extending portion of said washer, said locking element being of normally truncated conical configuration but being permanently deformable to a flat annular radially extending condition upon torquing of said nut body toward a workpiece thereby to move a radially inner edge portion of said locking element into the annular recess in said bolt to preclude disassociation of said nut from said bolt.

2. The captive nut of claim 1 including a spacer disposed between said locking element and the radially extending portion of said washer.

* * * * *